(12) United States Patent
Lee et al.

(10) Patent No.: US 8,999,883 B2
(45) Date of Patent: Apr. 7, 2015

(54) ULTRAFINE FIBER-BASED COMPOSITES HAVING HIGH HYDROSCOPICITY

(75) Inventors: Jun Young Lee, Seoul (KR); Lyong Sun Pu, Seoul (KR); Sung Hee Kim, Seoul (KR)

(73) Assignees: Kaneka Corporation, Osaka (JP); Sungkyunkwan University Foundation for Corporate Collaboration of Sungkyunkwan University, Suwon-si (KR)

( * ) Notice: Subject to any disclaimer, the term of this patent is extended or adjusted under 35 U.S.C. 154(b) by 512 days.

(21) Appl. No.: 13/267,283

(22) Filed: Oct. 6, 2011

(65) Prior Publication Data

US 2013/0090232 A1 Apr. 11, 2013

(51) Int. Cl.
*B01J 20/26* (2006.01)

(52) U.S. Cl.
CPC .............. *B01J 20/26* (2013.01); *Y10S 502/526* (2013.01)

(58) Field of Classification Search
USPC .......................................... 502/401, 402, 526
See application file for complete search history.

(56) References Cited

U.S. PATENT DOCUMENTS

| 6,977,102 B2 * | 12/2005 | Watanabe et al. ............ 428/34.1 |
| 2010/0187137 A1 * | 7/2010 | Kitahara et al. .............. 206/205 |

FOREIGN PATENT DOCUMENTS

| KR | 10-0287862 B1 | 11/1999 |
| KR | 10-0990481 B1 | 8/2009 |

* cited by examiner

*Primary Examiner* — Edward Johnson
(74) *Attorney, Agent, or Firm* — Westerman, Hattori, Daniels & Adrian, LLP

(57) ABSTRACT

The present invention relates to ultrafine fiber-based composites comprising at least one ultrafine fiber-type hydrophobic polymer and oxide moisture absorbent particles distributed on the polymer. The ultrafine fiber-based composites may be appropriately used as sealing materials which can prevent the functional deterioration of electric or electronic devices and enhance the stability due to their high hydroscopicity and ability to maintain their appearance without change after the absorption of moisture.

16 Claims, 21 Drawing Sheets

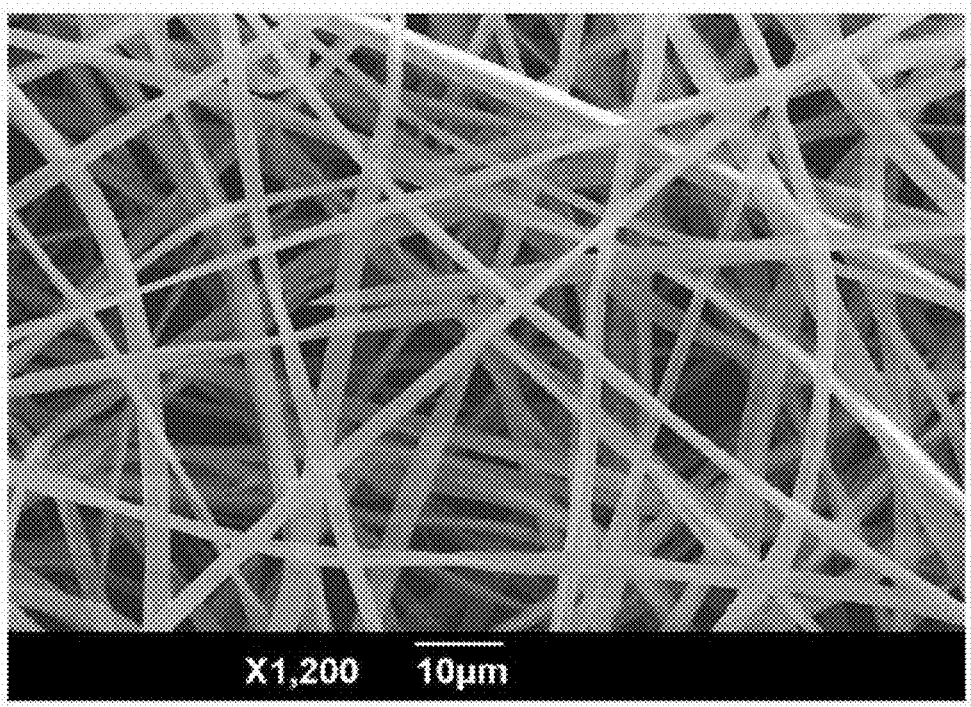

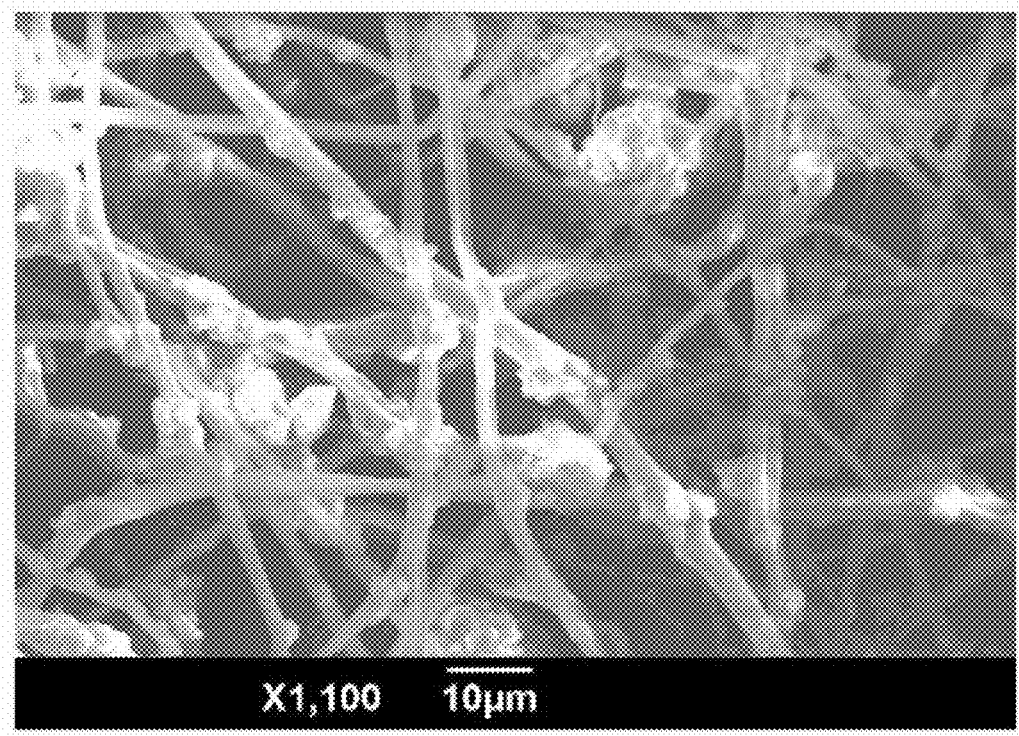

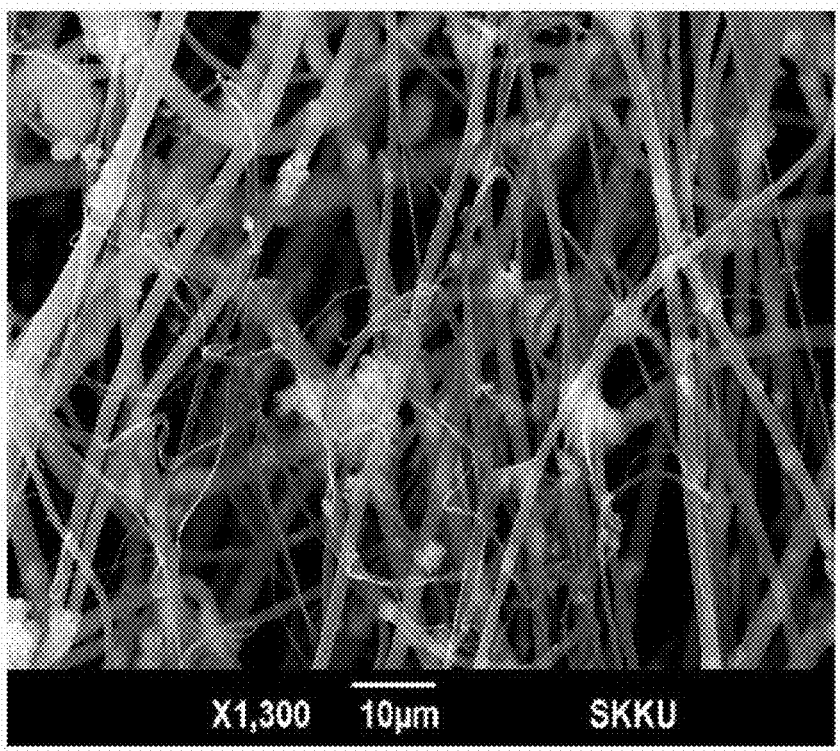

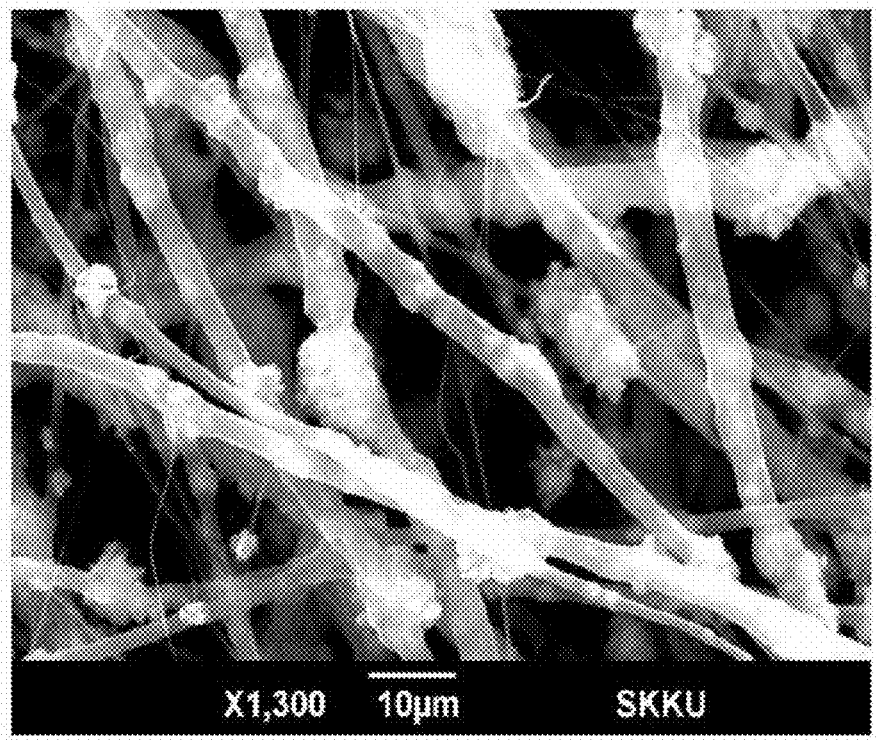

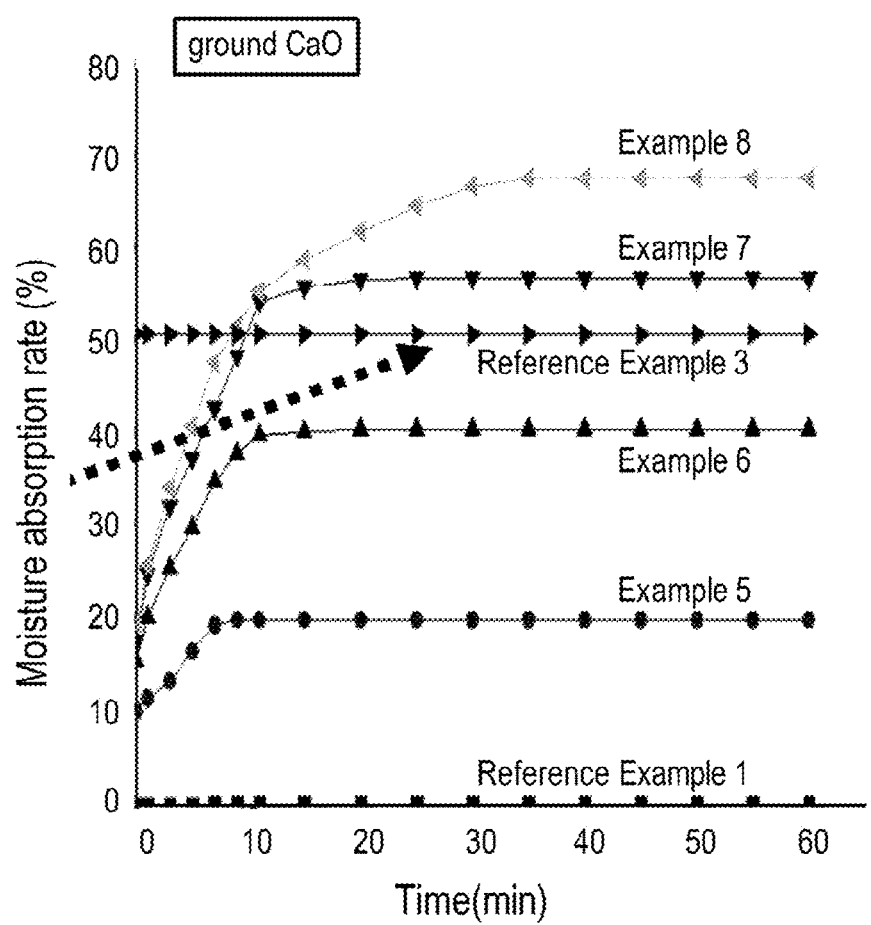

ULTRAFINE FIBER-BASED COMPOSITES HAVING HIGH HYDROSCOPICITY

TECHNICAL FIELD

The present invention relates to ultrafine fiber-based composites, their preparation methods, and sealing materials using the same. More specifically, the present invention relates to ultrafine fiber-based composites based on hydrophobic polymer ultrafine fibers and oxide moisture absorbent particles, their preparation methods, and sealing materials using the same.

BACKGROUND

Recently, there has been a growing demand and interest in sealing materials which are capable of blocking oxygen and moisture in the field of electric or electronic devices.

For example, due to their flexible component materials, flexible organic light-emitting devices (OLED) require that the electroluminescent (EL) layer material be protected from oxygen or moisture permeation. Such protection of EL layer material is extremely important because it closely relates to the reliability of the display device. Technically, multilayered thin film packages are commonly used which are capable of completely blocking the permeation of oxygen or moisture on the front side. However, it is impossible to completely prevent the permeation of oxygen or moisture at the edges, resulting in damage to the devices. Meanwhile, sealing materials for flexible OLED which are capable of efficiently blocking the permeation of moisture/oxygen at the edges have not been developed yet, and very little research has been done regarding sealing materials that can block the permeation of oxygen and moisture from the side of devices.

SUMMARY

The present invention is directed to overcoming the above-mentioned deficiencies in the art and has the objective of providing novel hydroscopic ultrafine fiber-based composites having high hydroscopicity and with no change in appearance even after moisture absorption, as well as their preparation methods.

Another object of the present invention is to provide novel hydroscopic ultrafine fiber-based composites which are capable of retaining moisture that has been once absorbed for a long period of time while not releasing the moisture, as well as their preparation methods.

Yet another object of the present invention is to provide a method of using novel hydroscopic ultrafine fiber-based composites as sealing materials which can prevent the functional deterioration of electric or electronic devices, thereby enhancing stability.

The ultrafine fiber-based composites according to the present invention include at least one ultrafine-fiber-type hydrophobic polymer and oxide moisture absorbent particles distributed on the polymer.

The ultrafine fiber-based composites according to the present invention are prepared by electrospinning an electrospinning solution comprising at least one hydrophobic polymer, at least one oxide moisture absorbent, and at least one solvent.

The preparation method of ultrafine fiber-based composites according to the present invention involves preparing an electrospinning solution comprising at least one hydrophobic polymer, at least one oxide moisture absorbent, and at least one solvent and electrospinning the electrospinning solution.

The electric or electronic device sealing materials according to the present invention include the above ultrafine fiber-based composites.

BRIEF DESCRIPTION OF THE DRAWINGS

FIGS. 3A to 3D are SEM photographs of the ultrafine fiber-based composites prepared in accordance with the reference example and working examples of the present invention, respectively.

FIGS. 4A to 4C are SEM photographs of the ultrafine fiber-based composites prepared in accordance with the comparative examples of the present invention, respectively.

FIGS. 9A and 9B are diagrams illustrating the change in moisture absorption rate over time for the ultrafine fiber-based composites prepared in accordance with the working examples of the present invention.

DETAILED DESCRIPTION

Hereinafter, the present invention will be described in detail by reference to the drawings attached hereto.

The ultrafine fiber-based composites according to the present invention include at least one ultrafine fiber-type hydrophobic polymer and oxide moisture absorbent particles distributed on the polymer.

Figure 1:
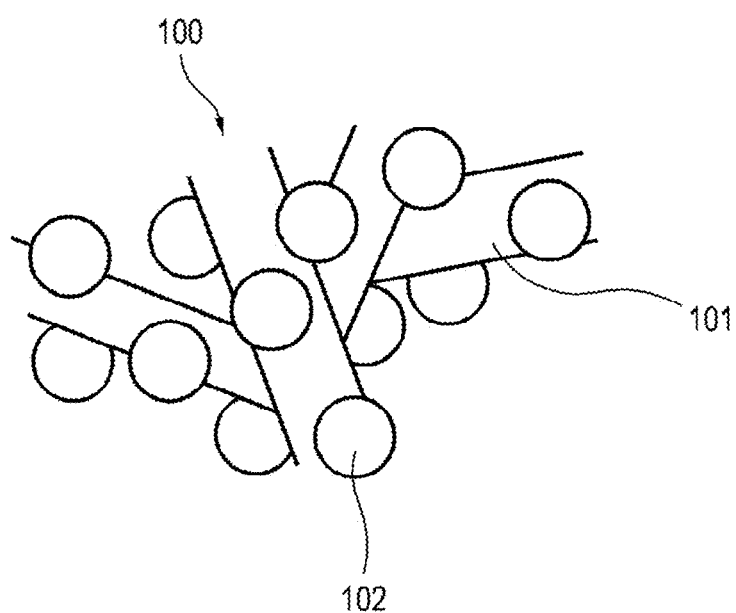
FIG. 1 is a conceptual diagram illustrating the ultrafine fiber-based composite according to the present invention.

FIG. 1 is a conceptual diagram illustrating the ultrafine fiber-based composite according to the present invention. As shown in FIG. 1, ultrafine fiber-based composites (100) include a plurality of ultrafine fiber-type hydrophobic polymers (101) which intersect to form a network. The ultrafine fiber-based composites (100) also include oxide moisture absorbent particles (102) which are randomly distributed on each polymer.

With respect to the ultrafine fiber-based composites according to the present invention, the ultrafine fibers have a diameter selected from a range of approximately 5 nm-3500 nm, specifically 20 nm-2000 nm, and more specifically 50 nm-1000 nm. Regarding the ultrafine fiber-based composites according to the present invention, the ultrafine fiber-based composites have a thickness selected from a range of up to 250 μm. However, the diameter of ultrafine fibers and thickness of ultrafine fiber-based composites are not limited to the ranges described above and may be adjusted to any diameter and thickness as long as they satisfy the moisture absorption rate required for the present invention in relation to other factors such as the type of polymer, type of moisture absorbent, density distribution, average particle diameter, type and size of the device to be used, etc.

With respect to the ultrafine fiber-based composites according to the present invention, the moisture absorbents are included in 2-200 parts, specifically 5-150 parts, and more specifically 10-100 parts by weight, relative to 100 parts of hydrophobic polymer. If the moisture absorbents are included in less than 2 parts by weight, it is difficult to sufficiently exhibit hydroscopic properties. If the moisture absorbents are included in more than 200 parts by weight, it may be difficult to carry out electrospinning.

Regarding the ultrafine fiber-based composites according to the present invention, the moisture absorbent particles can have a diameter selected from a range of up to 4 μm, specifically up to 3 μm, and more specifically up to 2 μm. However, the diameter of the moisture absorbent particles is not limited to the ranges described above and may be adjusted to any diameter as long as they satisfy the moisture absorption rate required for the present invention in relation to other factors such as the type of polymer being mixed, diameter of the ultrafine fiber, type of the moisture absorbent, density distribution, type and size of the device to be used, etc.

With respect to the ultrafine fiber-based composites according to the present invention, the diameter of the moisture absorbent particle can be selected from a range of up to 20 times the diameter of the ultrafine fiber. If the diameter of the moisture absorbent particle exceeds 20 times the diameter of the ultrafine fiber, it may not be able to form a composite with the ultrafine fibers due to the ultrafine fibers being severed during electrospinning.

Any polymer that is capable of functioning as a matrix polymer may be used as a hydrophobic polymer in the present invention. The hydrophobic polymer may include, for example, at least one selected from the;group consisting of polystyrene, styrene copolymer, polyethylene, ethylene copolymer, polybutadiene, butadiene copolymer, polyvinylidenefluoride, fluorine polymer, polysulfone, polyethersulfone, polyacrylonitryl, polyurethane, and polymethacrylate ester such as polymethylmethacrylate, polyethylmethacrylate, polypropylmethacrylate, polyisopropylmethacrylate and the like. The hydrophobic polymer may be specifically polyvinylidenefluoride or polymethacylate ester, more specifically polyvinylidenefluoride.

Any oxide capable of capturing moisture may be used as a moisture absorbent in the present invention. The oxide may include, for example, at least one selected from the group consisting of alkaline metal oxide, alkaline-earth metal oxide, $B_2O_3$, $Al_2O_3$, $SiO_2$, zeolite, and $P_2O_5$. The alkaline metal oxide may be $Li_2O$, $Na_2O$, or $K_2O$, while the alkaline-earth metal oxide may be BaO, CaO, or MgO. The oxide used in the present invention may be specifically BaO, MgO, or CaO, more specifically CaO.

In addition to the hydrophobic polymer and oxide moisture absorbents described above, the ultrafine fiber-based composites of the present invention may further include any other components which are conventionally used in the field of sealing materials for electric or electronic devices, such as oxygen scavengers, viscosity modifiers, photopolymerizable monomers, initiators, and the like. Such additional components are introduced in an amount that is commonly used in the field of sealing materials for electric or electronic devices.

Hereinafter, the preparation methods for ultrafine fiber-based composites according to the present invention will be described.

The method for preparing ultrafine fiber-based composites according to the present invention involves: preparing an electrospinning solution comprising at least one hydrophobic polymer, at least one oxide moisture absorbent, and at least one solvent; and electrospinning the electrospinning solution.

Figure 2A:
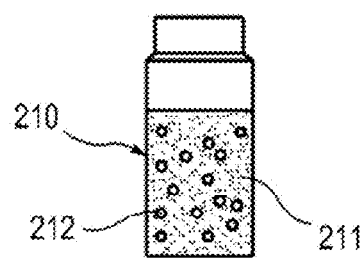
FIGS. 2A and 2B are conceptual diagrams illustrating the preparation method for ultrafine fiber-based composites according to the present invention.
Figure 2B:
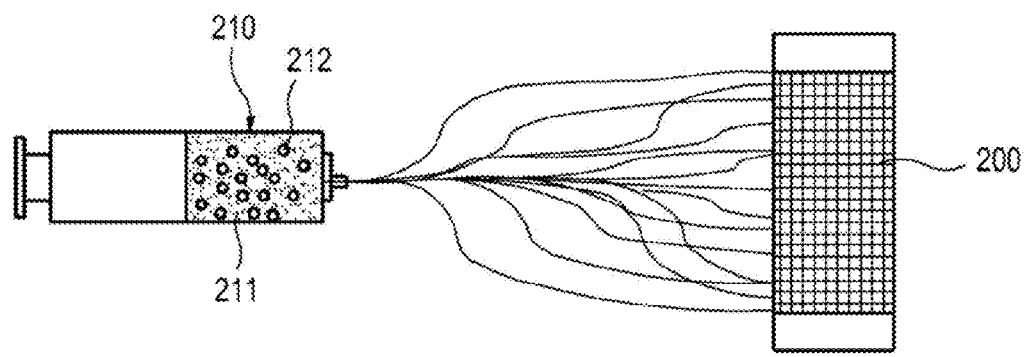

FIGS. 2A and 2B are conceptual diagrams illustrating the preparation method of the ultrafine fiber-based composites according to the present invention. To a mixture (211) of at least one hydrophobic polymer and at least one solvent is added at least one oxide moisture absorbent (212) to prepare an electrospinning solution (210) as illustrated in FIG. 2A. Thereafter, as shown in FIG. 2B, the electrospinning solution (210) is electrospun to prepare ultrafine fiber-based composites (200).

In the preparation method of ultrafine fiber-based composites according to the present invention, the hydrophobic polymers and oxide moisture absorbents are the same as described above.

The solvent that can be used in the preparation method of ultrafine fiber-based composites according to the present invention may include, but is not limited to, N,N-dimethylformamide, chloroform, chlorobenzene, tetrahydrofuran, toluene, acetone, methanol, ethanol, butanol, dimethylsulfoxide, N-methylpyrrolidinone, N,N-dimethylacetamide, benzene, dioxane, hexane, cyclohexane, acetic acid or water. Various solvents ranging from polar solvents to non-polar solvents may be used. In addition, a single solvent may be used or a solvent combining two or more substances may be used.

The preparation method of ultrafine fiber-based composites according to the present invention may further involve grinding the moisture absorbent prior to preparing the electrospinning solution. The grinding methods for moisture absorbents are not limited to any method and may use grinding means including, for example, mortar, ball mill, rod mill, jet mill, attritor mill, ultrasonication, etc.

The preparation method of ultrafine fiber-based composites according to the present invention may be carried out in the presence of an inert gas such as nitrogen, helium, neon, argon, and the like.

Electrospinning utilizes the principle that when a high voltage is applied to a polymer solution, the charged solution undergoes fission, whereby the solvent evaporates to create a fibrous state and ultrafine fibers are collected on an earthed collector plate.

The electrospinning device used in the present invention is installed as follows. First, the anode is connected to the metal part of the injection needle and the collection plate is earthed. In addition, the peripheral devices and the metal parts of the exterior of the devices are earthed to protect against unnecessary discharge phenomena, which occur when electrospinning the conductive polymer, as much as possible. Since webs overlap with each other due to the spinning of the collector plate during electrospinning, they are heated with a heater to prevent the webs from being tangled and forming a film due to insufficient evaporation of the solvent. The heating temperature of the collector plate heater may be selected from a range of 50° C. to 120° C., specifically 60° C. to 110° C. However, the heating temperature is not limited to the above ranges but may be adjusted to any temperature range as long as it satisfies the effect required for the present invention.

The ultrafine fiber-based composites according to the present invention have a high hydroscopicity and are capable of maintaining their forms without any change in appearance even after moisture absorption.

In addition, the ultrafine fiber-based composites according to the present invention can retain moisture once absorbed for a long period of time without releasing it. In particular, the ultrafine fiber-based composites can be kept in the moisture retention state even at high temperatures and under vacuum conditions.

The ultrafine fiber-based composites according to the present invention can be used as sealing materials for electric or electronic devices such as display devices like OLED. For example, they can be used as materials for sealing the inside, front side, end portion and the edge of devices. The ultrafine fiber-based composites according to the present invention can prevent the penetration of moisture into electric or electronic devices and absorb the moisture inside the devices, whereby the electric or electronic devices are protected from functional deterioration and thus have enhanced stability.

The present invention will be described more in detail by way of the following working examples and experimental examples. However, it should be noted that the working examples and experimental examples below are for illustrative purposes only and are not intended to limit the category or scope of the present invention.

EXAMPLES 1-4 AND REFERENCE EXAMPLES 1-2

Preparation of Electrospinning Solution

The electrospinning solution was prepared by a two-stage process and then spun. First, 1.0 g of polyvinylidenefluoride (PVDF; ALFA AESAR, MFCD00084470, 23500-29500 poise) as the hydrophobic polymer was admixed with 10 ml of complex solvent comprising acetone (99.9%, SIGMA CHEMICAL CO.) and N,N-dimethylacetamide (99.8%, SIGMA CHEMICAL CO.) having a volume ratio of 8:2. Thereafter, a CaO moisture absorbent (SIGMA CHEMICAL CO., particle diameter of 2-3 μm) was added to the above prepared mixture in the amount of 0.3 g (Example 1), 0.5 g (Example 2), 0.7 g (Example 3), and 1.0 g (Example 4), respectively. In addition, an electrospinning solution with no moisture absorbent CaO added was prepared as Reference Example 1, while CaO particles were prepared as Reference Example 2. When adding the moisture absorbents, the ultrasonic disperser SH-750S (YTK) was used for 5 minutes for effective dispersion.

Preparation of Ultrafine Fiber-Based Composites using Electrospinning

ESR-200R2D (NANO NC CO.: eS-robot spinning nozzle stage used) was used as the electrospinning apparatus. ESN-HV30 was used as the high voltage power supply, which has a high voltage application capacity of up to (+)30 kV, 2 mA required for electrospinning. A drum collector was used as a collector plate and TZ4M (AUTONICS) was used as a heater for the collector plate. A syringe having a 15-ml volume was used. An injection needle having a 0.22 mm diameter (NANO NC CO.) was used. The gap between the injection needle and the collector plate was maintained at 100 mm.

The electrospinning was carried out as follows. The electrospinning solution prepared above was poured into the syringe under a nitrogen-filled atmosphere so that there was minimum moisture content, and then was discharged at a flow rate of 7, 7, 5, 3.5, and 2.7 ml/hr for Reference Example 1, Example 1, Example 2, Example 3, and Example 4, respectively. The voltage was 15 kv. The heater of the collector plate was set at 100° C. to accelerate the evaporation of the solvent.

Teflon films or poly(3,4-ethylenedioxythiophene)(PEDOT) films were attached to the collector plate in order to facilitate the detachment of ultrafine fiber-based composites from the films. The ultrafine fiber-based composites thus prepared were placed in a glove box or a desiccator with silica gel so that they do not absorb moisture immediately.

Surface Observation using Scanning Electron Microscope (SEM)

Figure 3B:
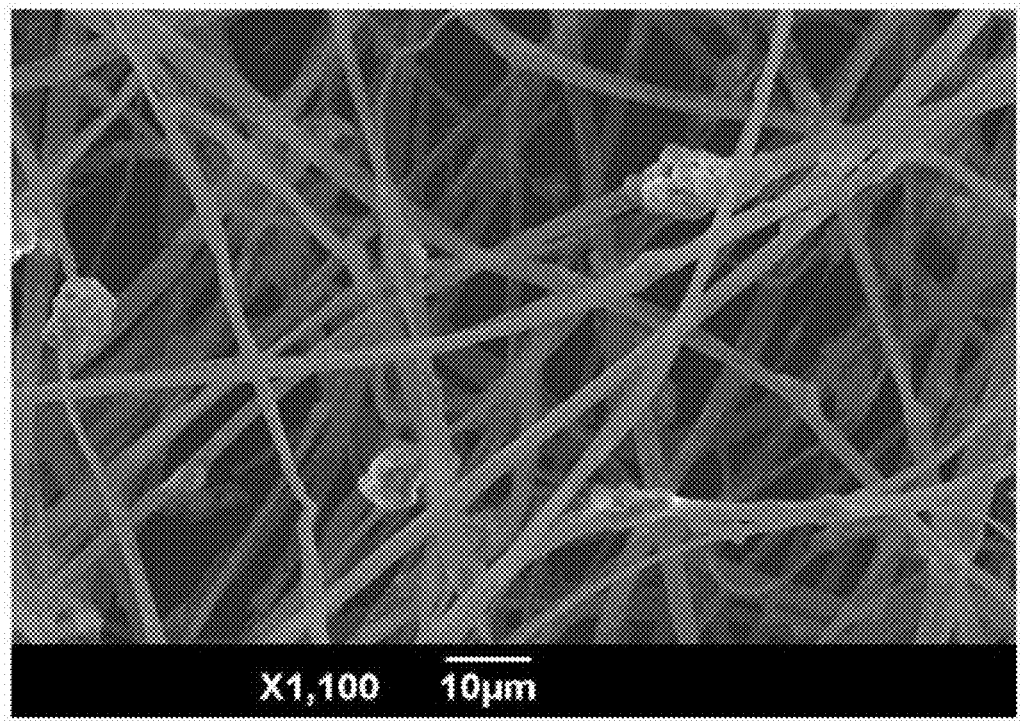
Figure 3D:
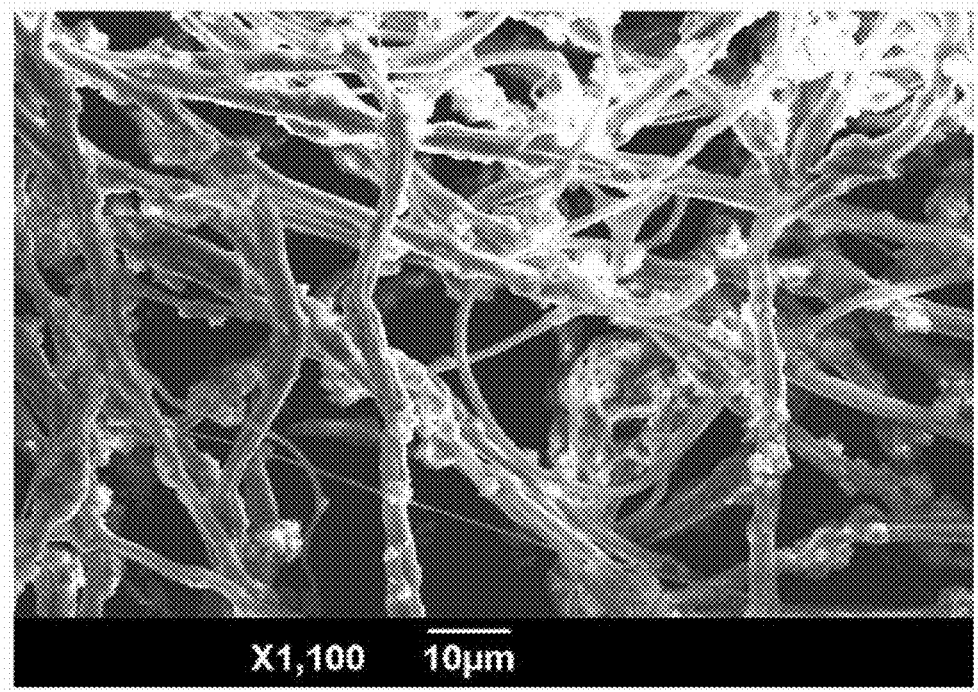

FIGS. 3A to 3D show the results of observation by SEM of ultrafine fiber-based composites prepared according to Examples 1-3 and Reference Example 1. As shown in FIG. 3A which is the SEM photograph of Reference Example 1, the electrospun hydrophobic polymer PVDF exhibited the form of ultrafine fibers, and as shown in FIGS. 3B to 3D which are the SEM photographs of Examples 1-3, the ultrafine fiber-based composites exhibited a bead phase where ultrafine fibers of the hydrophobic polymer and the moisture absorbent particles co-exist as the moisture absorbents were added. In addition, as can be seen from FIGS. 3B to 3D, the amount of CaO adsorbed onto the surface of hydrophobic polymer ultrafine fibers varied depending on CaO moisture absorbent content. It was more difficult to obtain ultrafine fibers with uniform diameters as more moisture absorbent was added.

COMPARATIVE EXAMPLES 1-4

As comparative examples, ultrafine fiber-based composites were prepared in the same manner as described in Reference Example 1 and Examples 1-3 with the exception that 1.0 g of hydrophilic polymer polyvinylpyrrolidone (weight average molecular weight: 360,000, SIGMA CHEMICAL CO.) was admixed with 10 ml of methanol solvent (99.8%, SIGMA CHEMICAL CO.) without any CaO moisture absorbent added to the solution (Comparative Example 1) or with the CaO moisture absorbent added in the amount of 0.3 g (Comparative Example 2), 0.5 g (Comparative Example 3), and 0.7 g (Comparative Example 4), respectively. Each of the ultrafine fiber-based composites prepared above was referred to as Comparative Examples 1 to 4, respectively.

Figure 4B:
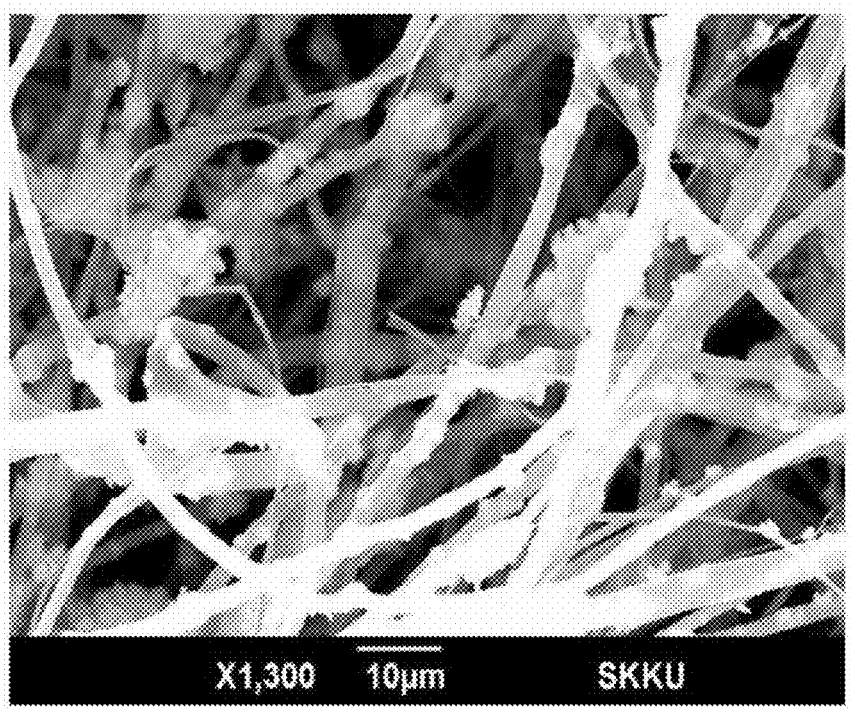

FIGS. 4A to 4C show the results of observation by SEM of the ultrafine fiber-based composites prepared in Comparative Examples 2 to 4. As shown in FIGS. 4A to 4C, the amount of CaO adsorbed onto the surface of hydrophilic polymer ultrafine fibers varied depending on the CaO moisture absorbent content. It was more difficult to obtain ultrafine fibers with uniform diameters as more moisture absorbent was added.

COMPARATIVE EXAMPLES 5 to 8

Film composites were prepared in the same manner as described in Reference Example 1 and Examples 1-3 with the exception of spin coating for 1 min at a speed of 2000 rpm instead of electrospinning. Each of the film composites thus obtained was referred to as Comparative Examples 5 to 8, respectively.

EXAMPLES 5 to 8 AND REFERENCE EXAMPLE 3

Ultrafine fiber-based composites were prepared in the same manner as described in Examples 1-4 with the exception that CaO moisture absorbent ground by a mortar (particle diameter of 1-2 μm) was used. Each of the ultrafine fiber-based composites thus obtained was referred to as Examples 5-8 (CaO/polymer weight ratios of the composites were 0.3, 0.5, 0.7, and 1.0). In addition, ground CaO moisture absorbent particles were prepared as Reference Example 3.

Figure 5A:
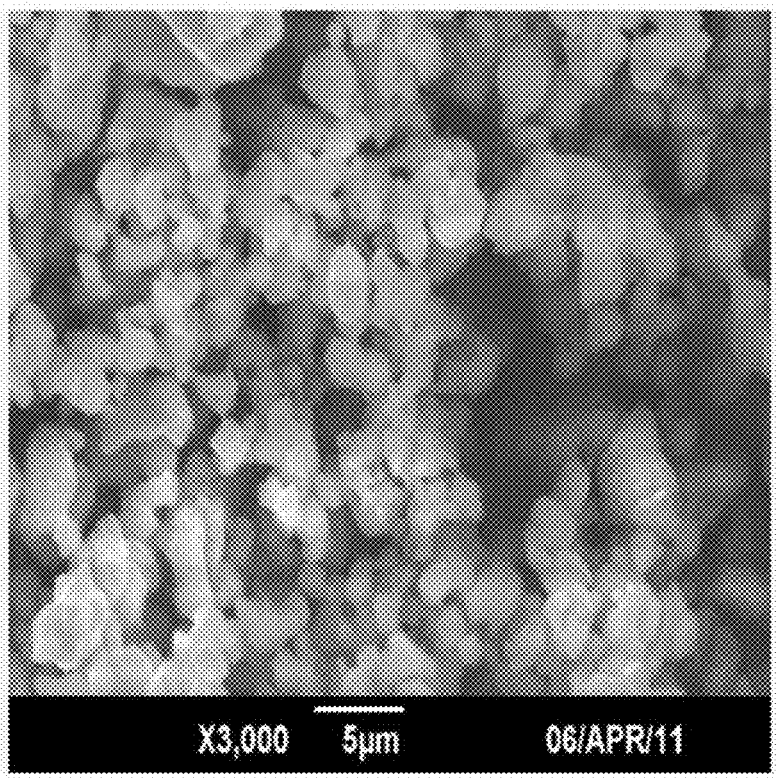
FIGS. 5A and 5B are SEM photographs of CaO used in the working examples of the present invention before and after grinding, respectively.
Figure 5B:
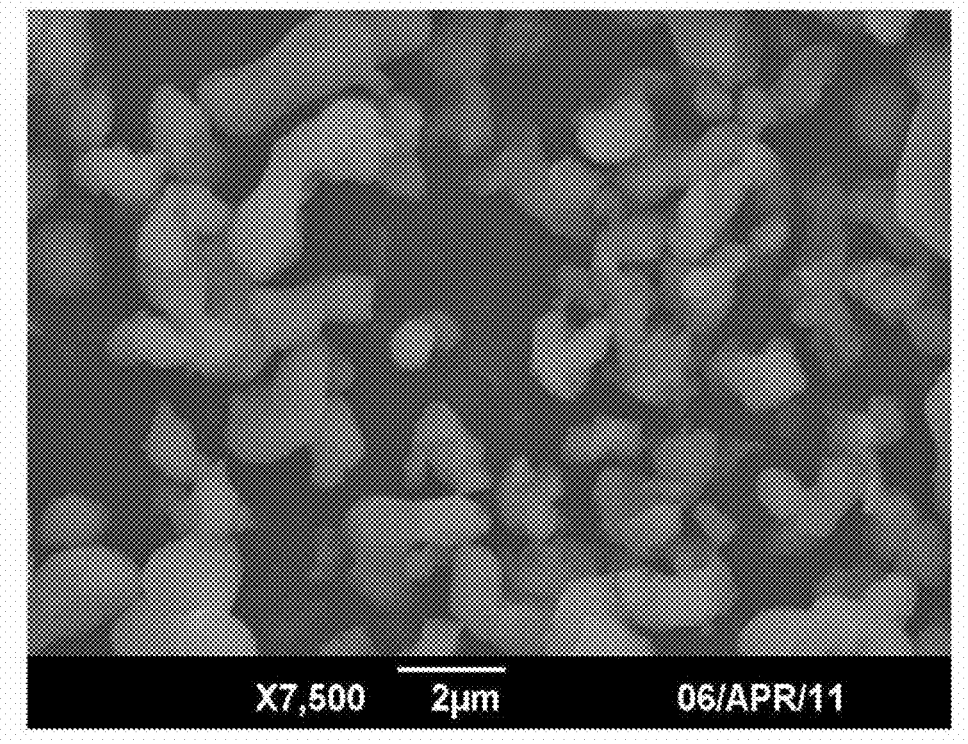
Figure 6:
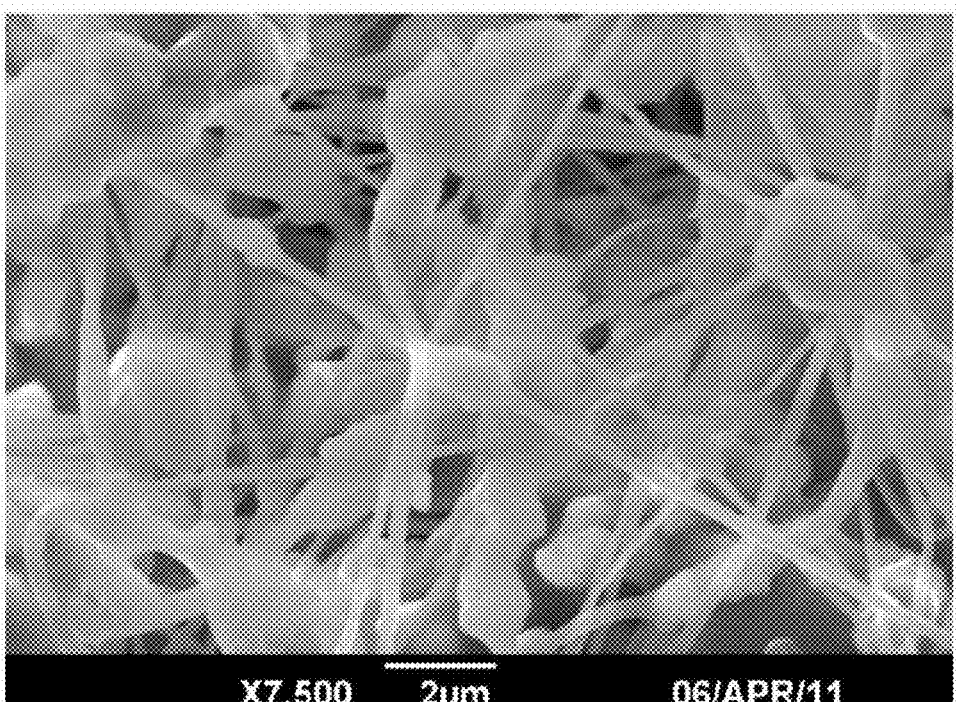
FIG. 6 is a SEM photograph of the ultrafine fiber-based composite using ground CaO, which was prepared in accordance with the working example of the present invention.

FIGS. 5A to 5B show the SEM photographs of CaO before and after grinding, while FIG. 6 shows the SEM photograph of ultrafine fiber-based composites prepared in Example 8.

EXAMPLES 9-11

Ultrafine fiber-based composites were prepared in the same manner as described in Examples 2-4 with the exception that 1.0 g of polymethylmethacrylate (SIGMA CHEMICAL CO., weight average molecular weight: 996,000) as hydrophobic polymer was admixed with 10 ml of complex solvent comprising toluene (99.8%, SIGMA CHEMICAL CO.) and acetone (99.9%, SIGMA CHEMICAL CO.) having a volume ratio of 7:3 and the CaO moisture absorbent was added in the amount of 0.5 g (Example 9), 0.7 g (Example 10), 1.0 g (Example 11), respectively. Each ultrafine fiber-based composite was referred to as Examples 9-11.

EXPERIMENTAL EXAMPLE 1

Measurement of Moisture Absorption Rate

The ultrafine fiber-based composites, film composites, and CaO particles prepared in Examples 1-11, Comparative Examples 1-8, and Reference Examples 1-3 were measured with respect to moisture absorption rates. First, after the ultrafine fiber-based composites, film composites and CaO particles were dried in glove boxes for 3 days at nitrogen atmosphere, their weights ($W_{dry}$) were measured. After these samples were kept in a thermo-hygrostat controlled at 25° C. under 80% relative humidity for 1 hour so as to absorb moisture, their weights ($W_{wet}$) were measured. The moisture absorption rate was calculated according to the following equation, and the results are shown in Table 1.

$$\text{Moisture Absorption Rate (\%)} = \frac{W_{wet} - W_{dry}}{W_{dry}} \times 100$$

TABLE 1

| | CaO/Polymer Weight Ratio | Moisture Absorption Rate (%) |
| --- | --- | --- |
| Example 1 | 0.3 | 19.9% |
| Example 2 | 0.5 | 37.6% |
| Example 3 | 0.7 | 53.1% |
| Example 4 | 1.0 | 61.3% |
| Example 5 | 0.3 | 20.1% |
| Example 6 | 0.5 | 40.8% |
| Example 7 | 0.7 | 57.2% |
| Example 8 | 1.0 | 68.1% |
| Example 9 | 0.5 | 31.5% |
| Example 10 | 0.7 | 52.7% |
| Example 11 | 1.0 | 60.1% |
| Comparative Example 1 | 0 | 8.5% |
| Comparative Example 2 | 0.3 | 11.9% |
| Comparative Example 3 | 0.5 | 31.3% |
| Comparative Example 4 | 0.7 | 34.1% |
| Comparative Example 5 | 0 | 0.23% |
| Comparative Example 6 | 0.3 | 0.32% |
| Comparative Example 7 | 0.5 | 2.11% |
| Comparative Example 8 | 0.7 | 2.73% |
| Reference Example 1 | 0 | 0.18% |
| Reference Example 2 | CaO only with no polymer | 24.8% |

TABLE 1-continued

| | CaO/Polymer Weight Ratio | Moisture Absorption Rate (%) |
| --- | --- | --- |
| Reference Example 3 | Ground CaO only with no polymer | 51.1% |

As shown in Table 1 above, the higher the CaO moisture absorbent content, more moisture was absorbed. Examples 1-11 using hydrophobic polymers were found to show higher moisture absorption rates compared to Comparative Examples 1-4 using hydrophilic polymers. Particularly, according to the working examples of the present invention, CaO in the ultrafine fiber-based composites showed a higher moisture absorption rate than the theoretical value. That is because CaO is distributed on the ultrafine fibers in a microparticulate form.

Figure 7:
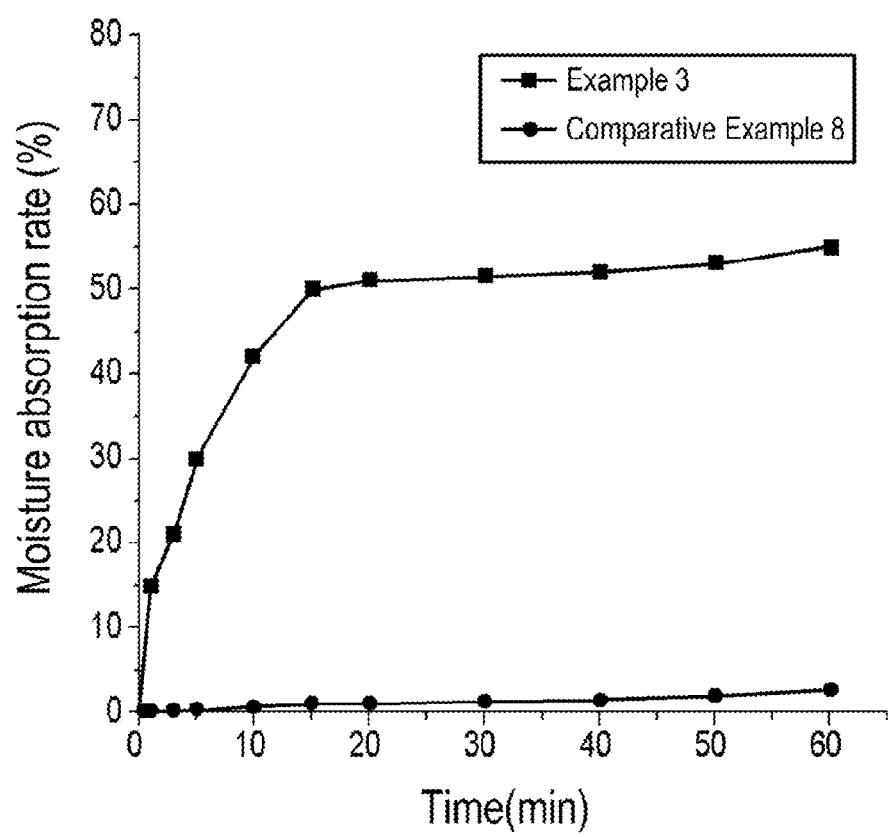
FIG. 7 shows the change in moisture absorption rate over time for the working example using electrospinning and the comparative example using spin coating of the present invention.

In addition, the film composites prepared in Comparative Examples 5-8 using spin coating were found to have markedly decreased moisture absorption rates compared to the ultrafine fiber-based composites prepared in Examples 1-4 using electrospinning. This is more evident from FIG. 7 which illustrates the change in moisture absorption rates over time for Example 3 and Comparative Example 8. As shown in FIG. 7, the ultrafine fiber-based composites prepared by electrospinning were superior to the film composites prepared by spin coating in terms of moisture absorption rate and absorption speed. It can be confirmed that the film form is not desirable compared to the ultrafine fiber-based composite form in terms of moisture absorption rate and absorption speed.

Figure 8:
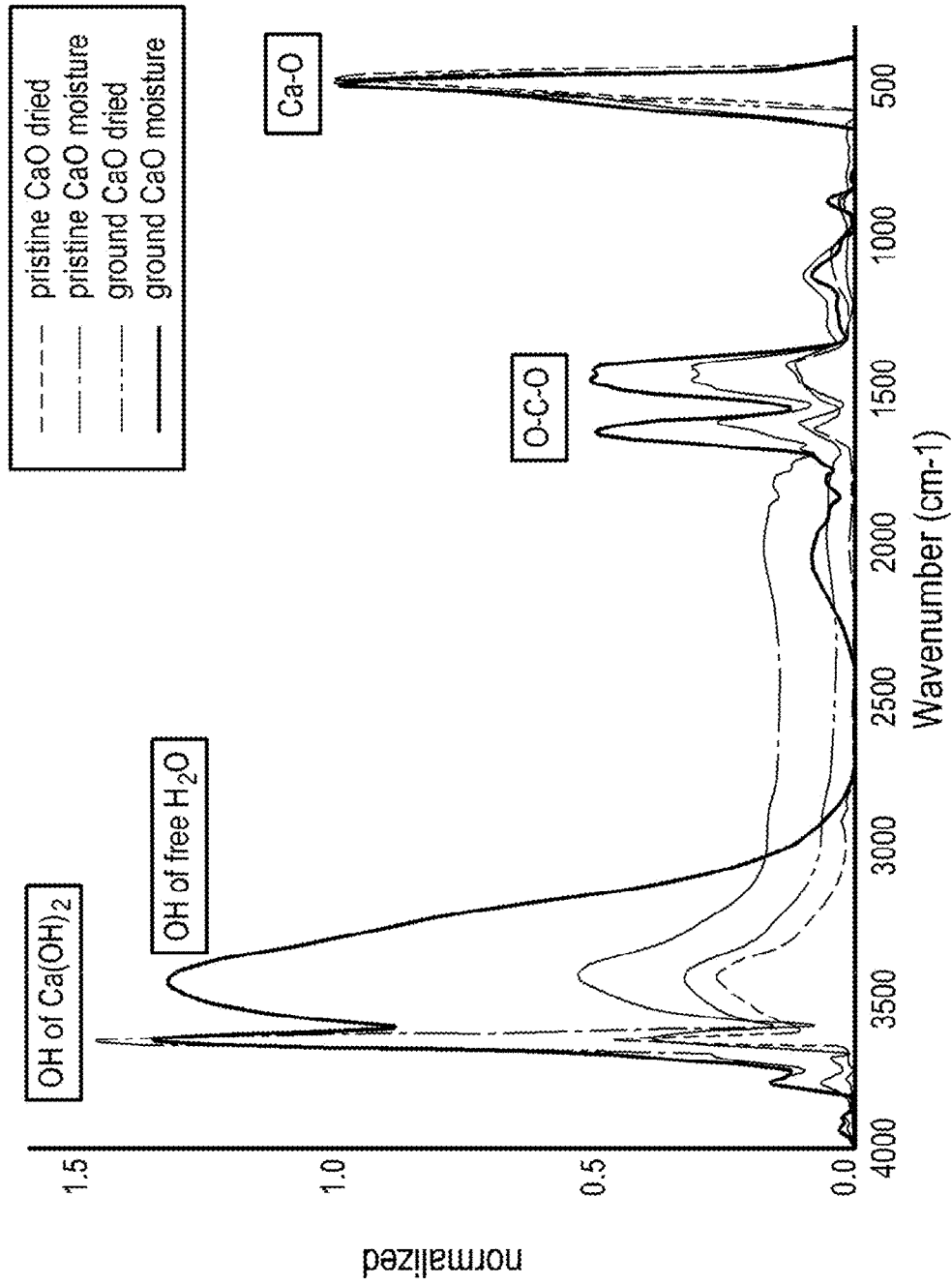
FIG. 8 shows the FT-IR spectra of pristine/ground CaO used in the working examples of the present invention in both dried and moisture-absorbed states.

Furthermore, Examples 5-8 where ground moisture absorbents were used showed superior moisture absorption rates compared to Examples 1-4 where pristine moisture absorbents were used. This phenomenon occurred because CaO absorbed more moisture due to its increased specific surface area as it was dispersed and adsorbed onto fibers in the form of small particles. In this regard, the FT-IR spectra of pristine/ground CaO in both dried and moisture-absorbed states were observed, and the results are shown in FIG. 8. As shown in FIG. 8, it was found that the ground CaO which had absorbed moisture has higher OH regions of $Ca(OH)_2$ and free $H_2O$ at a wavenumber of around 3500 cm$^{-1}$ in the FT-IR spectra than those of the pristine CaO which had absorbed moisture.

Figure 9A:
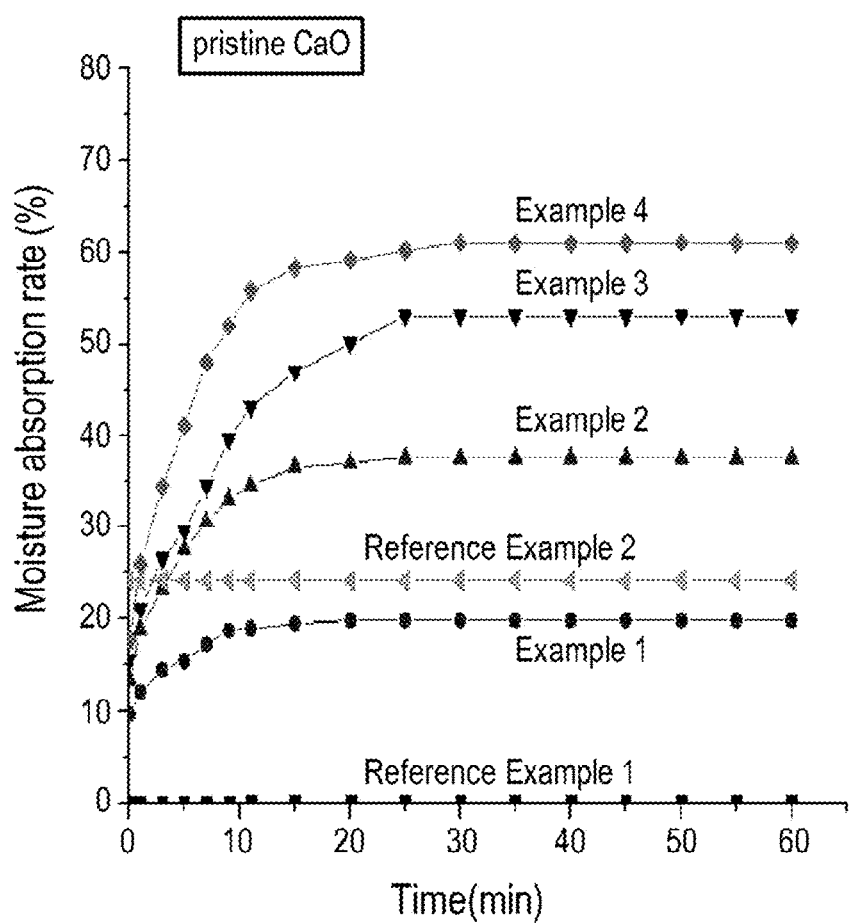

In addition, the ultrafine fiber-based composites using pristine and ground CaO were examined to understand the extent of moisture absorption over time using a thermo-hygrostat controlled at room temperature under 80% humidity for 1 hour. The results are illustrated in FIGS. 9A and 9B. As shown in FIGS. 9A and 9B, the moisture absorption rate was higher in cases where ground CaO was used (Examples 5-8) in comparison to cases where pristine CaO was used (Examples 1-4).

EXPERIMENTAL EXAMPLE 2

Observation of Change in Appearance

Figure 10A:
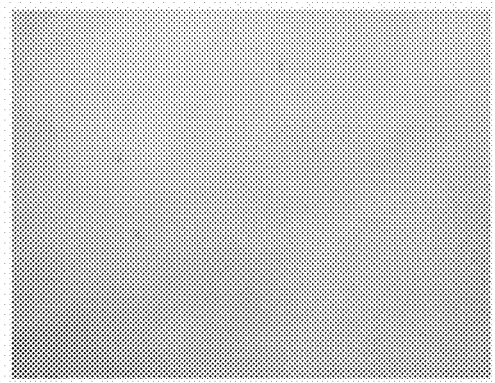
FIGS. 10A and 10B are diagrams observing the change in appearance over time for the ultrafine fiber-based composites using the hydrophilic polymer prepared according to the comparative examples of the present invention.
Figure 10B:
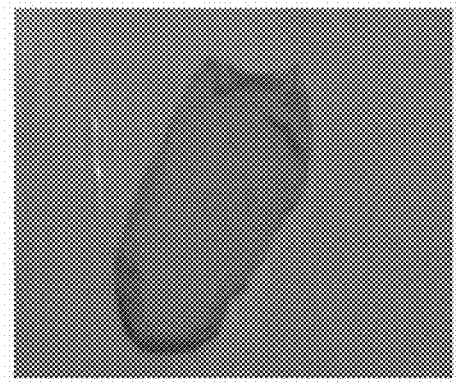
Figure 11:
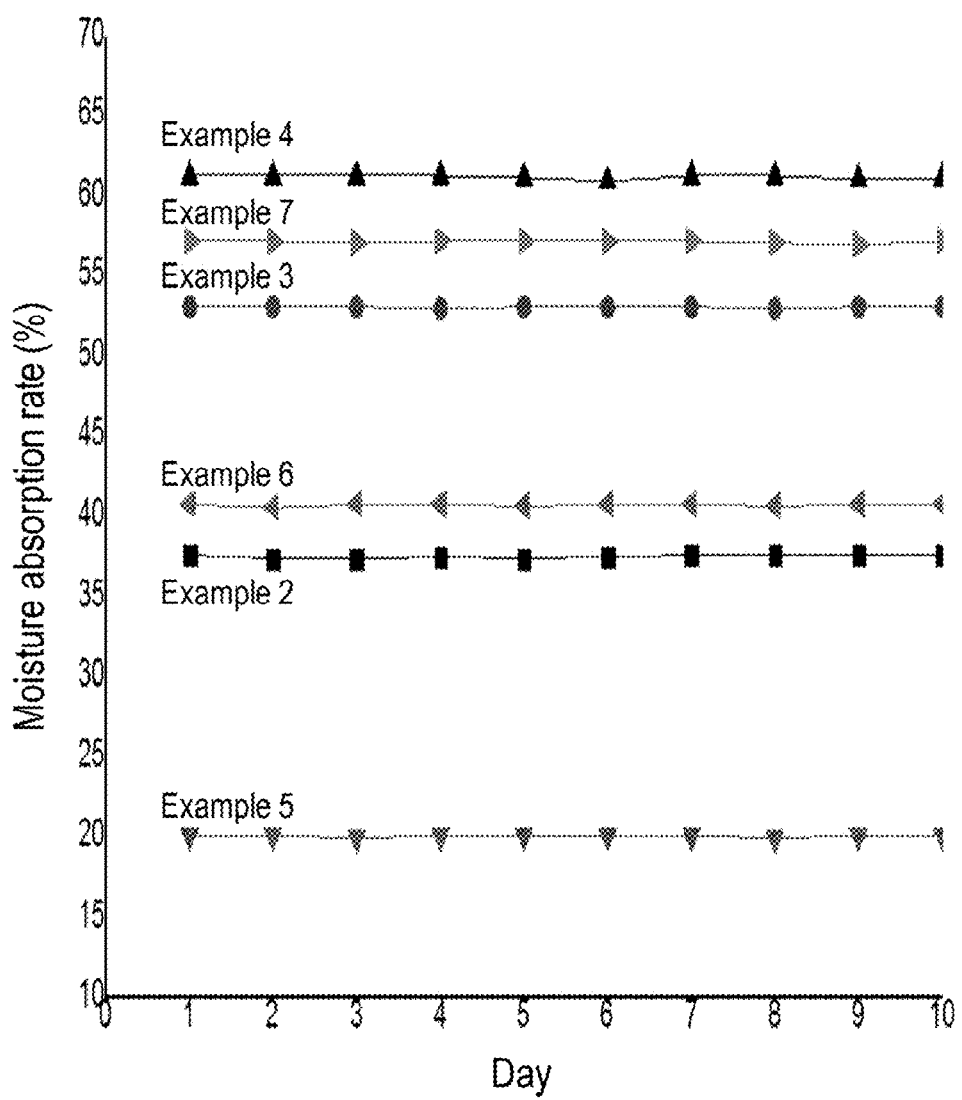
FIGS. 11 to 14 illustrate the results from observing the change in water retention capacity according to temperature/pressure when ultrafine fiber-based composites prepared according to the working examples of the present invention are left to stand for a long period of time.
Figure 12:
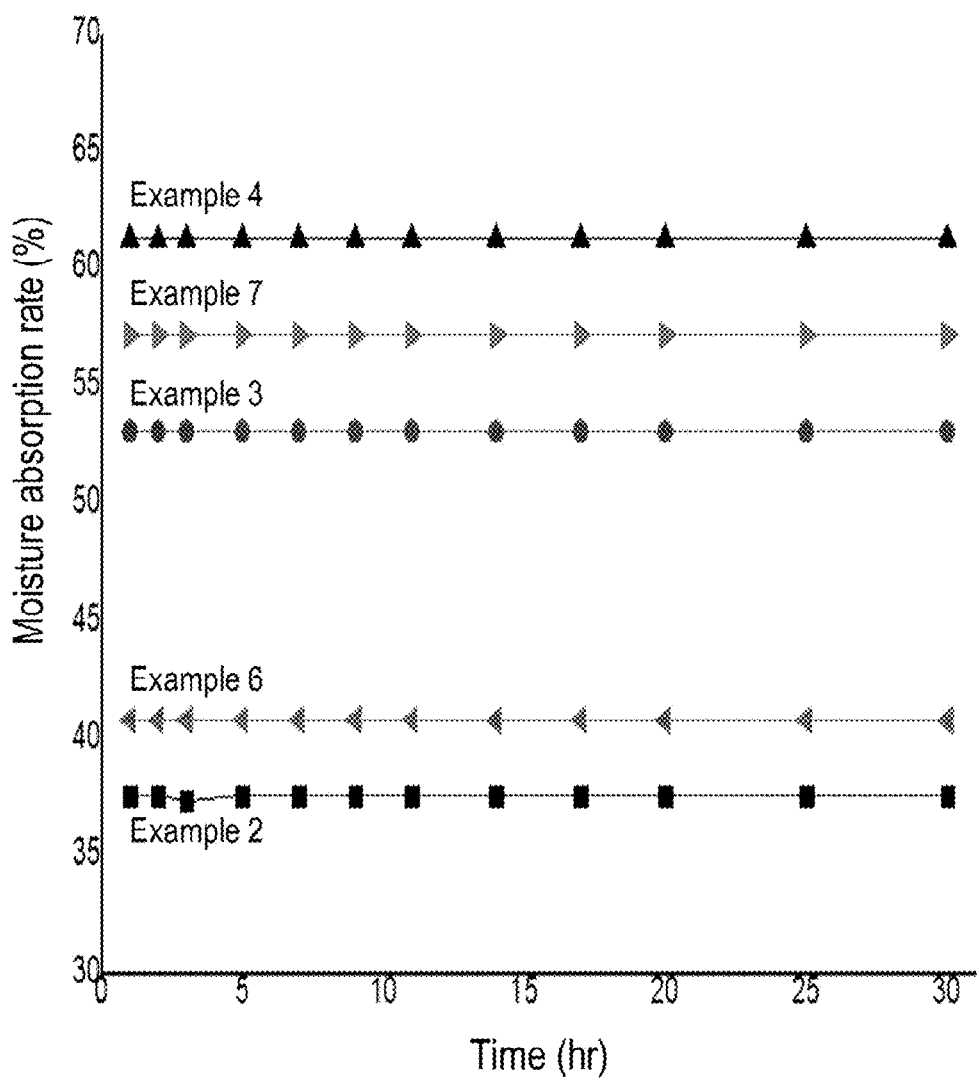
Figure 13:
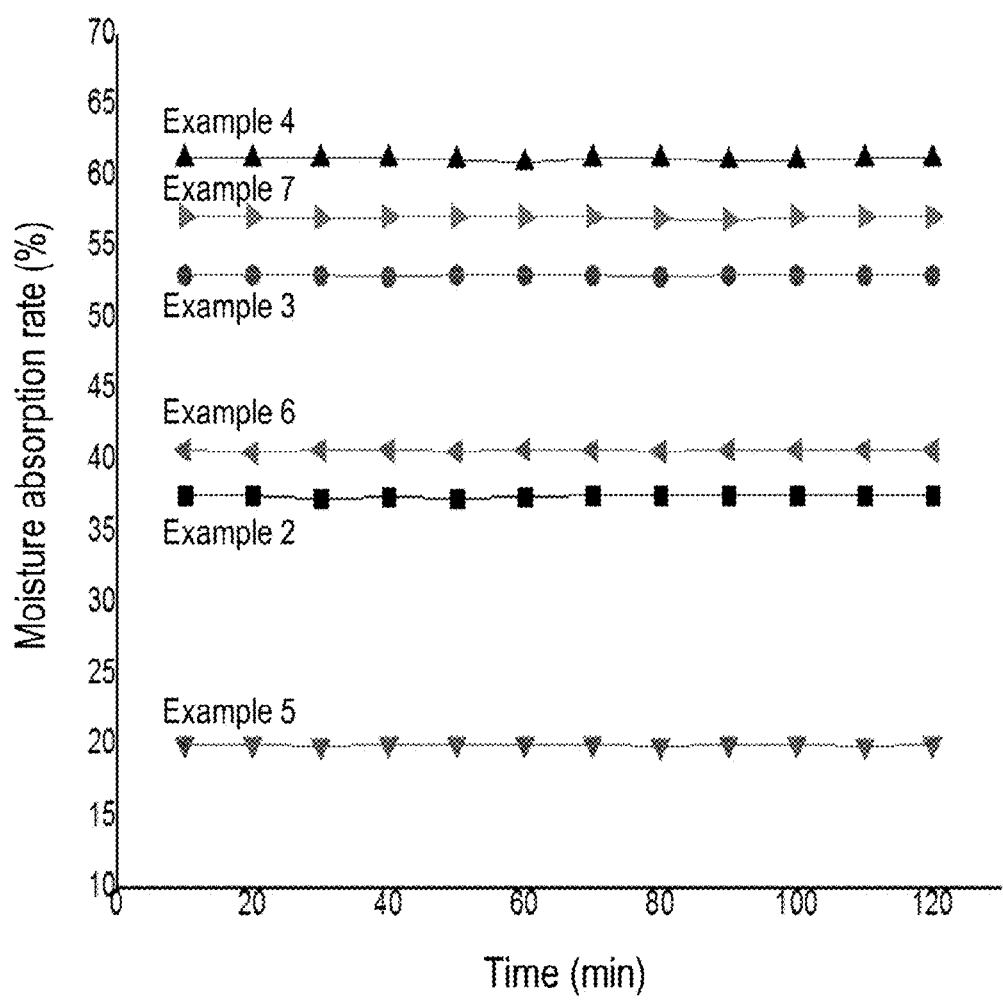
Figure 14:
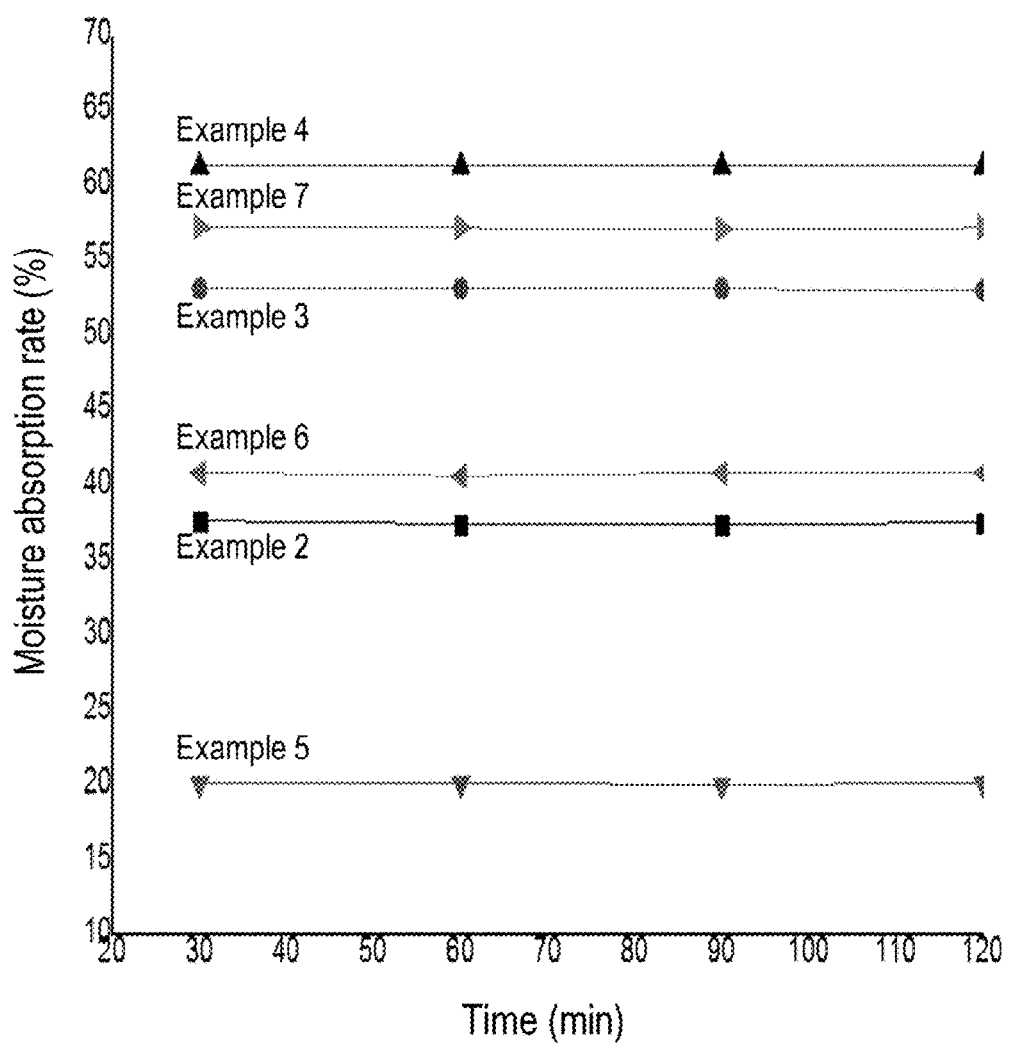

Changes in appearance were observed when the ultrafine fiber-based composites prepared in Examples 1-11 and Comparative Examples 1-4 were left to stand under atmospheric conditions for 1 week. As a result, no change in appearance was observed in the case of Examples 1-11. In the case of Comparative Examples 1 to 4 using the hydrophilic polymer, as shown in FIGS. 10A and 10B, the ultrafine fiber-based composites were changed from a form of FIG. 10A to a film form of FIG. 10B when they were allowed to stand under atmospheric conditions for a long period of time. It can be understood from the above that hydrophilic polymers are not suitable for use in sealing electric or electronic devices because they lead to changes in appearance due to their hydroscopic properties.

EXPERIMENTAL EXAMPLE 3

Observation of Moisture Retention Capacity

If ultrafine fiber-based composites release moisture that has been once absorbed, they only function as a cart that carries moisture. Therefore, in order to be used for sealing electric or electronic devices, ultrafine fiber-based composites should retain absorbed moisture even if they are physically affected. In the present experiment, in order to examine the change in moisture content, the ultrafine fiber-based composites which had absorbed moisture at a maximum level (Examples 2-7) were placed in the atmosphere for 10 days, in an oven at 70° C. for 30 hours, in a vacuum oven at 100° C. for 2 hours, and in a vacuum oven at 150° C. for 2 hours, respectively, and the results were illustrated in FIGS. 11-14. As shown in FIGS. 11-14, the ultrafine fiber-based composites according to the working examples of the present invention retained the initial moisture content without any change in appearance under all conditions.

What is claimed is:

1. Ultrafine fiber-based composites comprising at least one ultrafine fiber-type hydrophobic polymer and oxide moisture absorbent particles distributed on said polymer, wherein the ultrafine fibers have a diameter selected from a range of approximately 5 nm-3500 nm.

2. The composites of claim 1, wherein the hydrophobic polymer is at least one selected from the group consisting of polystyrene, styrene copolymer, polyethylene, ethylene copolymer, polybutadiene, butadiene copolymer, polyvinylidenefluoride, fluorine polymer, polysulfone, polyethersulfone, polyacrylonitryl, polyurethane, and polymethacrylate ester.

3. The composites of claim 2, wherein the hydrophobic polymer is at least one selected from the group consisting of polyvinylidenefluoride and polymethacrylate ester.

4. The composites of claim 1, wherein the oxide is at least one selected from the group consisting of alkaline metal oxide, alkaline-earth metal oxide, $B_2O_3$, $Al_2O_3$, $SiO_2$, zeolite, and $P_2O_5$.

5. The composites of claim 4, wherein the oxide is an alkaline-earth metal oxide of at least one selected from the group consisting of BaO, MgO, and CaO.

6. The composites of claim 5, wherein the alkaline-earth metal oxide is CaO.

7. Ultrafine fiber-based composites prepared by electrospinning an electrospinning solution comprising at least one hydrophobic polymer, at least one oxide moisture absorbent, and at least one solvent, wherein the ultrafine fibers have a diameter selected from a range of approximately 5 nm-3500 nm.

8. The composites of claim 7, wherein the hydrophobic polymer is at least one selected from the group consisting of polystyrene, styrene copolymer, polyethylene, ethylene copolymer, polybutadiene, butadiene copolymer, polyvinylidenefluoride, fluorine polymer, polysulfone, polyethersulfone, polyacrylonitryl, polyurethane and polymethacrylate ester.

9. The composites of claim 8, wherein the hydrophobic polymer is at least one selected from the group consisting of polyvinylidenefluoride and polymethacrylate ester.

10. The composites of claim 7, wherein the oxide is at least one selected from the group consisting of alkaline metal oxide, alkaline-earth metal oxide, $B_2O_3$, $Al_2O_3$, $S10_2$, zeolite, and $P_2O_5$.

11. The composites of claim 10, wherein the oxide is an alkaline-earth metal oxide of at least one selected from the group consisting of BaO, MgO, and CaO.

12. The composites of claim 11, wherein the alkaline-earth metal oxide is CaO.

13. A sealing material for electric or electronic devices comprising the ultrafine fiber-based composites of claim 1.

14. The sealing material of claim 13, wherein the electric or electronic device is an organic light emitting device.

15. A sealing material for an electric or electronic device comprising the ultrafine fiber-based composites of claim 7.

16. The sealing material of claim 15, wherein the electric or electronic device is an organic light emitting device.

* * * * *